May 26, 1953  M. J. GRAHAM  2,639,908
FLUSH GUN FOR AUTOMOBILE RADIATORS
Filed April 21, 1950
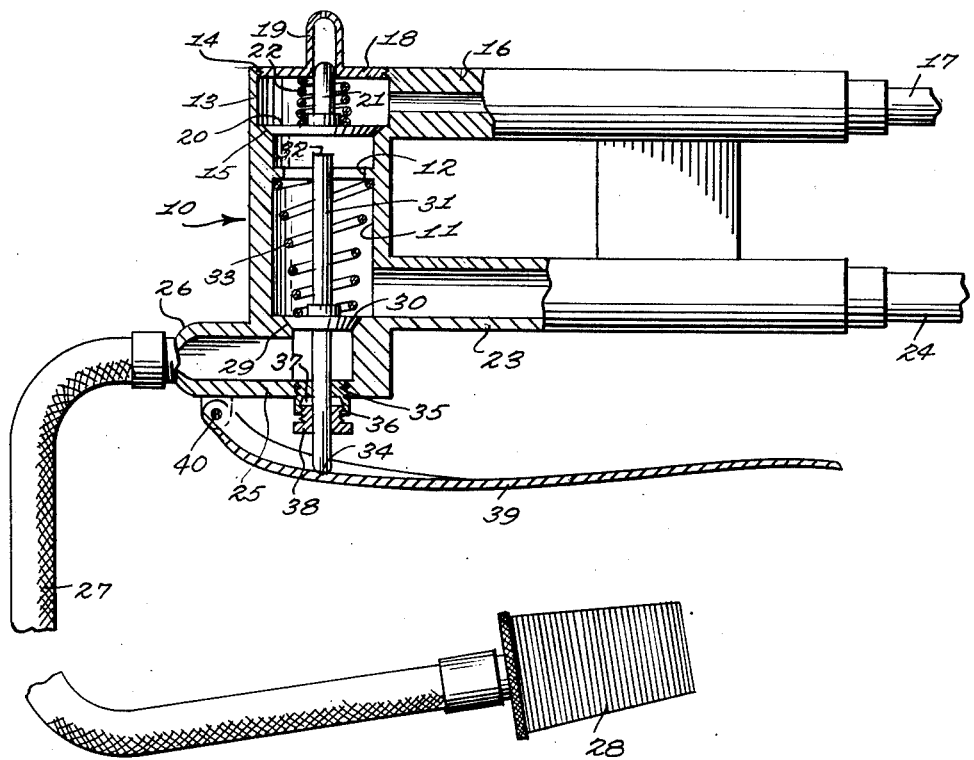
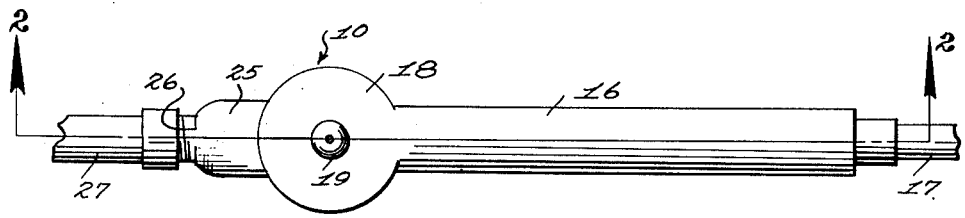
INVENTOR.
MERLE J. GRAHAM
BY
McMorrow, Berman & Davidson
ATTORNEYS Patented May 26, 1953

2,639,908

UNITED STATES PATENT OFFICE 2,639,908

FLUSH GUN FOR AUTOMOBILE RADIATORS

Merle J. Graham, Dickinson, N. Dak.

Application April 21, 1950, Serial No. 157,358

2 Claims. (Cl. 261—50)

My invention relates to improvements in flush guns for use in cleaning automobile radiators.

A primary object of the invention is to provide a flush gun for use in cleaning automobile radiators which is highly simplified in construction, very easy to operate and inexpensive to manufacture.

A further object is to provide an improved radiator flush gun having only one operating or control handle for controlling the flow of both water and air into the radiator while cleaning it.

A further object is to provide an automobile radiator flush gun having a novel and highly simplified compressed air and water valve arrangement, wherein the closing of the valves is assisted by the flow of the air and water through the gun.

A further object is to provide a radiator flush gun, wherein a single operating lever or handle may be shifted a certain distance for opening a water valve of the gun for introducing water into a radiator, the air valve of the gun remaining closed until the lever is shifted a further distance for opening the water and air valves simultaneously to introduce compressed air into the radiator behind the water.

A still further object of the invention is to provide a radiator flush gun of the above-mentioned character, wherein the water and compressed air valves will close automatically whenever the gun is dropped or the operating lever released.

Other objects and advantages of the invention will be apparent during the course of the following description.

In the accompanying drawings forming a part of this application, and in which like numerals are employed to designate like parts throughout the same:

Figure 1 is a plan view of a radiator flush gun embodying my invention; and

Figure 2 is a central, vertical, longitudinal, sectional view taken on line 2—2 of Figure 1, parts in elevation and part broken away.

In the drawings, where, for the purpose of illustration, is shown a preferred embodiment of my invention, the numeral 10 designates generally a valve body or casing having a main cylindrical bore or chamber 11 extending longitudinally therethrough. The valve casing is provided near its longitudinal center with an internal, narrow, annular flange 12, as shown, and the valve body is provided at one end with an enlarged counterbore or recess 13 having its outer end screw-threaded, as at 14, and leading into the main bore 11. A conically tapered valve seat 15 is formed between the recess or counterbore 13 and the bore 11 of the valve body.

At its end provided with the recess 13, the valve body includes a radial, tubular extension or nipple 16, preferably formed integrally therewith, and connected at its outer end by any conventional means with a flexible compressed air conduit 17. The bore of the nipple 16 leads into the side of the counterbore or recess 13, as shown, and a flat screw-threaded cap or plate 18 is detachably secured within the outer screw-threaded end of the recess 13. The screw-threaded cap 18 includes a central, axial, tubular extension or guide 19 integral therewith and concentric with the tapered valve seat 15. A normally closed, conically tapered valve element or disc 20 is mounted within the counterbore 13, and adapted to engage the valve seat 15, as shown. The valve disc 20 carries a central, axial stem 21 integral therewith, and this stem slidably engages in the tubular extension or guide 19 of the cap 18. A light, expansible coil spring 22 surrounds the stem 20, and has its opposite ends engaging the cap 18 and valve disc 20.

Near its end remote from the compressed air nipple 16, the valve casing 10 is provided with a second radial, elongated, tubular nipple or sleeve 23, preferably formed integrally therewith, and the outer end of the nipple 23 is connected by any conventional means with a flexible water conduit or hose 24. The bore of the nipple 23 leads into the bore 11 of the valve casing near the end of the valve casing remote from the counterbore 13. Integrally secured to the last-mentioned end of the valve casing 10 is a transverse or radial, short, tubular boss or sleeve 25 having its outer end 26 extending radially beyond the side of the valve casing remote from the nipples 16 and 23 and connected by any suitable conventional means with one end of an elongated, flexible hose 27 having a conventional radiator adapter or flushing nozzle 28 connected with its opposite end. The bore of the extension or sleeve 25 leads into the adjacent end of the bore 11, and a second, conically tapered valve seat or shoulder 29 is formed at the junction of the valve casing 10 and sleeve 25. A second conically tapered valve element or disc 30 is mounted within the bore 11 for engagement with the seat 29, and the valve disc 30 is rigidly secured to an elongated central, axial stem or rod 31 extending beyond the opposite faces of the valve disc 30 for substantial distances, as shown. One end of the rod or stem 31 extends substantially entirely through the bore 11, and terminates a slight distance from the valve disc 20, as at 32, where the valve disc 30 engages the seat 29. A conically tapered, expansible coil spring 33 surrounds the stem 31 within the bore 11, and the smaller end of the spring 33 engages the valve disc 30, while its larger end engages the annular flange 12. The spring 33 serves to maintain the valve disc 30 in normal engagement with the seat 29.

The other end of the stem or rod 31 extends transversely through the tubular boss or sleeve 25 and beyond the outer side of this sleeve for a substantial distance, as shown at 34. This end of the stem or rod 31 reciprocates through a screw-threaded tubular plug or cap 35 detachably secured within a screw-threaded opening in the outer side of the sleeve 25. The screw-threaded plug 35 is provided in its outer end with a screw-threaded opening or recess 36 receiving therein a suitable liquid-tight seal or packing 37 and a screw-threaded packing nut or gland 38, through which the stem 31 slidably extends. An elongated operating lever or handle 39 is arranged directly below the outer free end 34 of the stem 31, and this lever extends longitudinally of the nipples 16 and 23, and transversely of the valve casing 10. The forward end of the lever 39 is pivotally connected, as at 40, with the adjacent side of the sleeve 25 near the outer end of the sleeve. The opposite free end of the lever 39 terminates substantially adjacent to the outer ends of the nipples 16 and 23, as shown.

In use, the flexible conduits or hoses 17 and 24 are connected with sources of compressed air and water under pressure, not shown. The nozzle or adapter 28 is inserted into the bottom hose connection of the automobile radiator for reverse flushing of the radiator in a well known manner. If desired, the nozzle 28 may be inserted in the top water inlet extension of the radiator for flushing the radiator from its top. The nozzle 28 is held in place with one hand, and the other hand is used for holding the nipples 16 and 23 and operating lever 39 of the flushing gun. The lever 39 is now squeezed toward the water inlet nipple 23, and the valve disc 30 moves away from the seat 29 for admitting water under pressure into the hose 27. The valve stem 31, of course, moves upwardly with the valve disc 30 toward the valve disc 20, but the movement of the lever 39 is stopped before the end of the stem 31 unseats the valve disc 20. The water flowing through the hose 27 quickly fills the automobile radiator, and when this is accomplished, the lever 39 is squeezed further toward the nipple 23 for shifting the rod or stem 31 against the air valve disc 20 to unseat it. When this occurs, compressed air from the nipple 16 passes through the valve body 10 and sleeve 25, along with the water coming from the nipple 23. The compressed air forces the water through the hose 27 and nozzle 28 with considerable force, for flushing rust, deposits of oxides, and the like, from the automobile radiator. It should be noted that when the air valve disc 20 is opened, the water valve disc 30 likewise remains open, so that a mixture of compressed air and water is introduced into the radiator through the hose 27.

When it is desired to stop the flow of water and air into the radiator, it is merely necessary to release the operating handle 39, and the springs 22 and 33 will automatically close the valve discs 20 and 30 against their seats 15 and 29. Accordingly, whenever the flushing gun is laid aside or dropped, the flow of compressed air and water through the hose 27 will cease.

Since the nipples 16 and 23 discharge compressed air and water, respectively, against the top faces of the valve discs 20 and 30, Figure 2, the flow of compressed air and water through the flushing gun will tend to assist or aid in the closing or seating of the valve discs 20 and 30, and accordingly, it is necessary to provide only light or weak valve-closing springs 22 and 33.

I have found that the use of my radiator flushing gun greatly reduces the time required to flush an automobile radiator, because of the single control lever 39 for operating the two valve discs 20 and 30 simultaneously. In most conventional radiator flushing guns presently on the market, separate water and air valve actuators or handles are provided, so that it is necessary to lay the gun down each time it is desired to adjust or open and close the water valve, one hand being occupied at all times for holding the nozzle of the gun. My flushing gun is highly simplified and very compact in construction, light and easy to manipulate.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A radiator flushing gun comprising a tubular valve casing provided near its opposite ends with transverse air and water nipples, the casing having internal valve seats adjacent to the air and water inlet nipples and including a common tubular discharge extension at one end thereof, the tubular discharge extension being arranged beyond the adjacent nipple and valve seat, a discharge hose connected with the tubular discharge extension for receiving air and water from the discharge extension, a first valve disc mounted within the valve casing and engaging the valve seat adjacent to the air inlet nipple, a second valve disc mounted within the casing and engaging the valve seat adjacent to the water inlet nipple, springs mounted within the valve casing and connected with the first and second valve discs for maintaining them normally seated, a stem secured to the second valve disc and extending therethrough beyond the opposite sides of the same, one end of the stem extending across the tubular discharge extension and terminating exteriorly thereof, the opposite end of the stem extending through the valve casing and terminating near and spaced from the first valve disc, and a single operating lever pivotally connected with the tubular discharge extension and extending across and engaging the end of the stem disposed exteriorly of the discharge extension, the lever extending longitudinally of the air and water inlet nipples and forming therewith a handle for the gun, the lever being shiftable toward the nipples for moving the stem axially inwardly to unseat the second and first valve discs consecutively, the springs closing the valve discs automatically when the lever is released, the air and water from the nipples impinging against the sides of the valve discs remote from the seats for assisting the springs in holding the valve discs against the seats.

2. A control mechanism for the common discharge of water and compressed air comprising a tubular valve casing having a first and a second axially spaced internal valve seat formed therein, said casing being provided with a transverse air inlet nipple adjacent said first seat and a transverse water inlet nipple adjacent the second seat, a common discharge conduit connected to the casing in adjacency to the second valve seat, a first valve disc mounted within the casing and engaging the first valve seat and a second valve disc mounted within the casing and engaging the second valve seat, guide means for said first valve disc cooperatively formed on the casing and said valve disc, spring means associated with the said guide means for maintaining said valve disc normally seated, a stem fixedly disposed through the second valve disc and extending beyond the opposite sides of the second valve disc, resilient means engaging said second valve disc for maintaining it normally seated, said stem being axially shiftable and having one end engageable with the first valve disc for unseating it and the opposite end slidingly and sealingly disposed through the casing and an operating lever carried by the casing and engaging said last end of the stem for unseating the second valve disc to establish communication between the water inlet nipple and the discharge conduit and upon further actuation thereof establish simultaneous communication between the discharge conduit and the water and air inlet nipples in opposition to the spring and resilient means.

MERLE J. GRAHAM.

References Cited in the file of this patent

UNITED STATES PATENTS

| Number | Name | Date |
|---|---|---|
| 1,120,474 | Grimes | Dec. 8, 1914 |
| 1,256,853 | Warner | Feb. 19, 1918 |
| 2,112,546 | Smart | Mar. 29, 1938 |
| 2,152,767 | McKnight | Apr. 4, 1939 |
| 2,245,195 | Hopkins | June 10, 1941 |
| 2,450,308 | Smith | Sept. 28, 1948 |
| 2,455,754 | Glover | Dec. 7, 1948 |